(12) United States Patent
Stoica et al.

(10) Patent No.: US 9,954,848 B1
(45) Date of Patent: Apr. 24, 2018

(54) CENTRAL CRYPTOGRAPHIC MANAGEMENT FOR COMPUTER SYSTEMS

(71) Applicant: Wells Fargo Bank N.A., San Francisco, CA (US)

(72) Inventors: Andrei Stoica, Chandler, AZ (US); Sumit Murarka, Chandler, AZ (US); Michael Peter Ridilla, Charlotte, NC (US); Samir Rameshchandra Sanghvi, Chandler, AZ (US); Jerome Pradier, Mesa, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 96 days.

(21) Appl. No.: 14/245,600

(22) Filed: Apr. 4, 2014

(51) Int. Cl.
*H04L 29/06* (2006.01)
*H04L 9/32* (2006.01)

(52) U.S. Cl.
CPC ........ *H04L 63/0823* (2013.01); *H04L 9/3268* (2013.01); *H04L 29/06775* (2013.01); *H04L 9/3263* (2013.01)

(58) Field of Classification Search
CPC . H04L 12/2409; H04L 12/2412; H04L 12/04; H04L 41/04; H04L 41/046; H04L 41/048; H04L 63/06; H04L 63/062; H04L 63/08; H04L 63/0823; H04L 9/083; H04L 29/06707; H04L 29/06721; H04L 9/3263–9/3268; H04L 29/06775; H04L 2209/64; G05B 2219/31161; G05B 2219/33277
See application file for complete search history.

(56) References Cited

U.S. PATENT DOCUMENTS

| 4,912,762 A | 3/1990 | Lee et al. |
| 4,918,728 A | 4/1990 | Matyas et al. |

(Continued)

FOREIGN PATENT DOCUMENTS

| EP | 0200343 A2 | 11/1986 |
| EP | 0287720 A1 | 10/1988 |

(Continued)

OTHER PUBLICATIONS

Press, J., A New Approach to Cryptographic Facility Design. ICL Technical Journal. vol. 8. No. 3. UK. May 1993, 1 page, Abstract only.

(Continued)

*Primary Examiner* — Daniel Potratz
(74) *Attorney, Agent, or Firm* — Merchant & Gould P.C.

(57) ABSTRACT

A system implemented on a server computer for managing digital certificates includes a certificate management agent module, a digital certificate processing module and a configuration module. The certificate management agent module processes requests to create a plurality of certificate management agents. Each of the certificate management agents is configured to manage a lifecycle of a digital certificate for a client electronic device. The digital certificate processing module processes requests from the certificate management agent module for digital certificates for the plurality of certificate management agents. The configuration module receives and processes configuration parameters for the certificate management agents and for the digital certificates.

7 Claims, 12 Drawing Sheets

(56) References Cited

U.S. PATENT DOCUMENTS

| | | | |
|---|---|---|---|
| 4,941,176 | A | 7/1990 | Matyas et al. |
| 5,007,089 | A | 4/1991 | Matyas et al. |
| 5,103,478 | A | 4/1992 | Matyas et al. |
| 5,931,917 | A | 8/1999 | Nguyen et al. |
| 5,996,076 | A | 11/1999 | Rowney et al. |
| 6,061,791 | A | 5/2000 | Moreau et al. |
| 6,072,870 | A | 6/2000 | Nguyen et al. |
| 6,215,877 | B1 | 4/2001 | Matsumoto |
| 6,233,565 | B1 | 5/2001 | Lewis et al. |
| 6,237,096 | B1 | 5/2001 | Bisbee et al. |
| 6,324,525 | B1 | 11/2001 | Kramer et al. |
| 6,442,690 | B1 | 8/2002 | Howard, Jr. et al. |
| 6,658,568 | B1 | 12/2003 | Ginter et al. |
| 6,978,025 | B1 | 12/2005 | Price, III |
| 7,054,447 | B1 | 5/2006 | Price, III |
| 7,529,925 | B2 | 5/2009 | Harkins |
| 8,291,224 | B2 | 10/2012 | Pelton et al. |
| 8,635,446 | B2 | 1/2014 | Pelton et al. |
| 9,258,128 | B1* | 2/2016 | Tytula .................. H04L 9/3263 |
| 2001/0026619 | A1 | 10/2001 | Howard, Jr. et al. |
| 2002/0013897 | A1 | 1/2002 | McTernan et al. |
| 2002/0042829 | A1 | 4/2002 | Mizuhara et al. |
| 2002/0051539 | A1 | 5/2002 | Okimoto et al. |
| 2002/0062451 | A1 | 5/2002 | Scheidt et al. |
| 2002/0083438 | A1 | 6/2002 | So et al. |
| 2002/0126849 | A1 | 9/2002 | Howard, Jr. et al. |
| 2002/0131601 | A1 | 9/2002 | Ninomiya et al. |
| 2002/0178354 | A1 | 11/2002 | Ogg et al. |
| 2003/0074552 | A1 | 4/2003 | Olkin et al. |
| 2003/0074555 | A1 | 4/2003 | Fahn et al. |
| 2003/0110262 | A1* | 6/2003 | Hasan ................ H04L 41/0213 709/226 |
| 2003/0147535 | A1 | 8/2003 | Nadooshan et al. |
| 2003/0149869 | A1 | 8/2003 | Gleichauf |
| 2003/0167403 | A1 | 9/2003 | McCurley et al. |
| 2004/0005061 | A1 | 1/2004 | Buer et al. |
| 2004/0044739 | A1 | 3/2004 | Ziegler |
| 2004/0064710 | A1 | 4/2004 | Vainstein |
| 2004/0105549 | A1 | 6/2004 | Suzuki et al. |
| 2004/0117623 | A1 | 6/2004 | Kalogridis et al. |
| 2004/0123129 | A1 | 6/2004 | Ginter et al. |
| 2004/0139320 | A1 | 7/2004 | Shinohara |
| 2004/0177260 | A1 | 9/2004 | Gilfix et al. |
| 2005/0062998 | A1 | 3/2005 | Kumashio |
| 2005/0129281 | A1 | 6/2005 | Ashizaki et al. |
| 2005/0223242 | A1 | 10/2005 | Nath |
| 2006/0126848 | A1 | 6/2006 | Park et al. |
| 2006/0236096 | A1* | 10/2006 | Pelton .................... H04L 63/06 713/155 |
| 2008/0307488 | A1* | 12/2008 | Hammond, II ....... H04L 41/046 726/1 |
| 2014/0025627 | A1* | 1/2014 | Bhattacharya ...... H04L 41/0843 707/609 |

FOREIGN PATENT DOCUMENTS

| | | | |
|---|---|---|---|
| EP | 1241826 | A2 | 9/2002 |
| EP | 1274243 | A2 | 1/2003 |
| WO | 9852316 | A1 | 11/1998 |
| WO | 9914979 | A1 | 3/1999 |
| WO | 0025473 | A1 | 5/2000 |
| WO | 0045347 | A1 | 8/2000 |
| WO | 0122322 | A2 | 3/2001 |
| WO | 0122650 | A2 | 3/2001 |
| WO | 0122651 | A2 | 3/2001 |
| WO | 0239224 | A2 | 5/2002 |
| WO | 03034682 | A1 | 4/2003 |

OTHER PUBLICATIONS

Applied Cryptography and Network Security. Second International Conference. ACNS 2004. Lecture Notes in Comput. Sci. vol. 3089_ Springer-Verlag, Berlin, Germany. 2004, 1 page, Abstract only.

Berson, T. A., Cryptography Everywhere. Advances in Crytology—ASIACRYPT 2000. 6th International Conference on the Theory and Application of Cryptology and Information Security. Lecture Notes in Computer Science vol. 1976 Springer-Verlag. Berlin, Germany, 2000, 1 page, Abstract only.

Branstad, D. K. et al. Policy-Based Cryptographic Key Management: Experience with the KRP Project. Proceedings DARPA Information Survivability Conference and Exposition. DISCEX/OO. vol. 1. IEEE Compul. Soc. Las Alamitos, CA. 1999, 1 page, Abstract only.

Cungang, Yang et al. Cryptographic Key Management Solution in a Role Hierarchy. Canadian Conference on Electrical and Computer Engineering 2004. vol. 1. IEEE. Piscataway, NJ. 2004, 1 page, Abstract only.

Dawson, E. et al. Key Management in a Non-Trusted Distributed Enviornment. Future Generation Computer Systems. vol. 16. No. 4. Elsevier. Feb. 2000. The Netherlands, 1 page, Abstract only.

Eddon, et al. Understanding the DCOM Wire Protocol by Ana:lyzing Network Data Packets. http://www.msdn.com/MSJ/March 1998, 20 pages.

Ehrsam, W. F. et al. A Cryptographic Key Management Scheme for Implementing the Data Encrypting Standard. IBM Systems Journal. vol. 17. No. 2. 1978, 1 page, Abstract only.

Fullard, R., Cryptographic Key Management. INFOSEC'90. Information Security Symposium Proceedings. CSIR. Pretoria, South Africa. 1990, 1 page, Abstract only.

Gerberick, D. A., Cryptographic Key Management or Strong Network Security Management. SIGSAC Review vol. 8. No. 2. Summer 1990, 1 page, Abstract only.

IMCentric, Inc. Automating Digital Certificate Management. IMCentric Product Overview for AutoCert Manager. http://www.IMCentric.com. Admitted prior art as of the earliest priority date for this application, 2 pages.

IMCentric, Inc. IMCentric Product Overview. http://www.IMCentric.com. Admitted prior art as of the earliest priority date for this application, 1 page.

Lehane, B. et al. Shared RSA Key Generation in a Mobile Ad Hoc Network. MILCOM 2003. 2003 IEEE Military Communications Conference. vol. 2. IEEE. Piscataway, NJ. 2003 1 page, Abstract only.

Lennon, R. E. et al. Cryptographic PIN Processing in EFT Systems. COMPCON 79 Proceedings Using Microprocessors Extending Our Reach. IEEE. New York. 1979. 1 page, Abstract only.

Matyas, S. M. et al. A Key Management Scheme Based on Control Vectors. IBM Systems Journal. vol. 30. No. 2 1991, 1 page, Abstract only.

Newman, D. B., Jr. et al. Public Key Management for Network Security. IEEE Network. vol. 1. No. 2 Apr. 1987, 1 page, Abstract only.

Oppliger, R., Protecting Key Exchange and Management Protocols Against Resource Clogging Attacks. Secure Information Networks. Communications and Multimedia Security. IFIP TC6/TC11 Joint Working Conference on Communications and Multimedia Security. Kluwer Academic Publishers, Norwell, MA. 1999, 1 page, Abstract only.

Patni, C. K., Smart Technology for Corporate Banking. Smart Card '91. International Exhibition. vol. 2. Agestream Ltd. Peterborough, UK. 1991, 1 page, Abstract only.

Perrig, et al. ELK, A New Protocol for Efficient Large-Group Key Distribution. University of California Berkeley. (prior art of record as of Jan. 2, 2010.), 16 pages.

Poovendran, R. On the Communication-Storage Minimization for a Class of Secure Multicast Protocols. IEEE Infocom 2001. Dept. of Electrical and Computer Engineering. University of Maryland, 11 pages.

Wadaa, A. et al. Scalable Cryptographic Key Management in Wireless Sensor Networks. Proceedings 24th International Conference on Distributed Computing System Workshops. IEEE Com put. Soc. Los Alamitos, CA. 2004, 1 page, Abstract only.

Wang Min, A New Cryptographic Key Management Scheme. Chinese Journal of Computers. vol. 16. No. 2. China. Feb. 1993, 1 page, Abstract only.

(56) References Cited

OTHER PUBLICATIONS

William, P. Cisco System's Simply Certificate Enrollment Protocol. White Paper. Aug. 29, 2003, 36 pages.
Wong, et al. Keystone: A Group Key Management Service. HRL Laboratories, LLC. Malibu, CA, May 2000, 6 pages.
Yeh, P.C. et al. ESAI390 Integrated Cryptographic Facility: An Overview. IBM Systems Journal. vol. 30. No. 2 1991, 1 page, Abstract only.
Wang, Yingjie et al. An Efficient Key Management for Large Dynamic Groups. Second Annual Conference on Communication Networks and Services Research. IEEE Com put. Soc. Los Alamitos. CA. 2004, 1 page, Abstract only.
Zugaj, A., Cryptographic Key Management in IT Networks. Przeglad Telekomunikacyjny + Wiadomosci Telekomucayjne. vol. 71. No. 10. SIGMA NOT. Poland. 1998, 1 page, Abstract only.

* cited by examiner

| | | |
|---|---|---|
| Agent ID | 402 | eae130ef-b9d3-c5d2-3a83-b8cbe2926d42 |
| Agent Name | 404 | cbui39089 |
| Host Name | 406 | cbui39089.wellsfargo.com |
| Assigned to Agent Group | 408 | WFIS_QA_NewGroup ▸ |
| Operating System | 410 | Linux (x86-64bit) ▸ |
| Operating System Version | 412 | 4 |
| Mutual Authentication Enabled | 414 | Yes ▸ |
| Machine ID Type | 416 | Network MAC Address (MAC) ▸ |
| Machine ID | 418 | 08-00-27-00-B4-E8 |
| Poll Messages Interval | 420 | 1440 (minutes) |
| Comments | 422 | Just a comment |
| 186 characters remaining — 424 | | (comma separated list) |
| Status | 426 | Active ▸ |
| Status Comments | 428 | |
| Last Status Modified By | 430 | WFCMS |

Update  Cancel
432   434

| | | |
|---|---|---|
| Agent ID | 502 | eae130ef-b9d3-c5d2-3a83-b8cbe2926d42 |
| Agent Group Code | 504 | Surya-AgentGroup_MOD1 |
| Operating System | 506 | Unix |
| Active | 508 | Yes ▼ |
| Configuration Name * | 510 | cbui39089 auth certificate |
| Shared with Agent Groups | | Ctrl Click to select multiple groups |
| | 512 | 2.4.0.5_testing<br>2_4_0_5_Bootstrap<br>3-21-2013SAG<br>A-Team<br>A-Team 007<br>A-Team 2<br>AAA Test002<br>AAA Test003 |
| Comments:<br>516 — 200 characters remaining | 514 | |
| Common Name * | 518 | auth-cbui39089 |
| Certificate Type * | 520 | 2010 - WF SSL Application Certificate ▼ |
| Certificate Authority * | 522 | WF Enterprise CA04 (SHA-256) ▼ |
| Trusted Registrar Group Code * | 524 | 133 [WFIS QA Group] ▼ |
| Organization * | 526 | WFIS |
| Organization Unit * | 528 | TGS |
| Locality | 530 | Chandler |
| State * | 532 | Arizona ▼ |
| Country * | 534 | United States ▼ |
| Private Key Length * | 536 | 2048 ▼ |
| Private Key Password * | 538 | ********** ☐ Auto-generated |
| Re-type Password * | 540 | ********** |

FIG. 5

| Field | Value | Number |
|---|---|---|
| Status Files (path + base filename) * | /opt/CertMan/certs/auth-cbui39089 | 576 |
| Status Files Permissions: | Owner: Read ☑ Write ☑  Group: Read ☐ Write ☐  Other: Read ☐ Write ☐ | 578 |
| Status Files Ownership | (userID:groupID) | 580 |
| Request Delay Time Interval (minutes) * | 15 | 582 |
| Expiration Check Interval (hours) * | 24 | 584 |
| Renewal Time Before Expiration (days) * | 30 (>0 and <60) | 586 |
| Provision Certificate Method * | Create Keystore ▶ | 588 |
| Validate Certificate Method * | Validate Certificate File ▶ | 590 |
| Application Type | Other web server ▶ | 592 |
| IP Address or URL | | 594 |
| Log Type | file ▶ | 596 |
| Configuration Specific Log File | /opt/CertMan/certs/auth-cbui39089.log | 598 |
| Script Log Type | System ▶ | 600 |

[ Update ] 602       [ Cancel ] 604

CENTRAL CRYPTOGRAPHIC MANAGEMENT FOR COMPUTER SYSTEMS

BACKGROUND

In an Internet environment, digital certificates are commonly used to authenticate communications between devices. The digital certificates authenticate a sender of the communications and also typically include a public key used to decrypt a received communication.

The digital certificates are generally provisioned for a fixed period of time, for example one or two years. Once the fixed period of time expires, the digital certificates are no longer valid. Management of digital certificates is needed to ensure that the digital certificates remain valid as long as they are needed and are renewed before they expire.

SUMMARY

Embodiments of the disclosure are directed to a system implemented on a server computer for managing digital certificates. The system comprises: a computer-readable storage medium encoding instructions; and a process programmed to execute the instructions to create: a certificate management agent module, the certificate management agent module processing requests to create a plurality of certificate management agents, each of the certificate management agents being configured to manage a lifecycle of a digital certificate for a client electronic device; a digital certificate processing module, the digital certificate processing module processing requests from the certificate management agent module for digital certificates for the plurality of certificate management agents; and a configuration module, the configuration module receiving and processing configuration parameters for the certificate management agents and for the digital certificates.

In another aspect, a method implemented on a server computer for managing digital certificates comprises: receiving a request to create a certificate management agent for a client electronic device; receiving configuration data for a digital certificate for the certificate management agent; using, by a computing device, the configuration data to request the digital certificate from a certificate authority; receiving the digital certificate from the certificate authority; generating an identifier for the certificate management agent; sending the identifier to the client electronic device; and sending the configuration data and the digital certificate to the client electronic device.

In yet another aspect, a method implemented on a client electronic device for obtaining a digital certificate comprises: installing a certificate management agent on the client electronic device; storing an identifier for the certificate management agent in a configuration file on the client electronic device; sending a request for configuration information for the certificate management agent to a server computer, the request including the identifier; receiving the configuration information for the certificate management agent from the server computer; sending a request for the digital certificate to the server computer; receiving the digital certificate from the server computer; storing the digital certificate on the client electronic device; and provisioning the digital certificate on the client electronic device.

The details of one or more techniques are set forth in the accompanying drawings and the description below. Other features, objects, and advantages of these techniques will be apparent from the description, drawings, and claims.

DESCRIPTION OF THE DRAWINGS

FIG. 4 shows an example user interface panel for creating a configuration for a certificate management agent.

FIGS. 5, 6 and 6A show a user interface panel for entering configuration data for a digital certificate.

DETAILED DESCRIPTION

The present disclosure is directed to systems and methods for centralized cryptographic management, including centralized management of digital certificates. Configuration information for the digital certificates for a plurality of client devices is stored at a central location, for example at a server computer or on a database accessible from the server computer. Certificate management agents are installed on the client devices. The certificate management agents have read access to the configuration information but are not permitted to modify the configuration information. The configuration information is managed at the server computer and downloaded to the client devices as needed.

A digital certificate is a digital credential that provides information about the identity of an entity such as a person or an organization. The digital certificate is used as part of a public key infrastructure (PKI) to enable information to be securely transferred over a public network such as the Internet. The digital certificate typically contains a name of the certificate holder, a serial number, an expiration date and a public cryptographic key for the certificate holder. The digital certificate is obtained from a certificate authority (CA) that manages security credentials and public keys for message encryption.

In a typical scenario using PKI, two keys are generated for each entity, a public key and a private key. The private key is kept by the entity and the public key is included in the digital certificate for the entity. A message sent by the entity is typically encrypted using the private key and decrypted by a receiving entity using the public key.

Centralized cryptographic administration is advantageous in that all digital certificates are in a central location. Modifications to configurations and downloads to certificate management agents can be handled in a more efficient manner than if changes were to be made on individual client devices. Typically, changes made on client devices require an administrative access level, such as root access. By making changes for the client devices at a central location, an administrator would only need access permissions at the central location and not at every client device.

Centralized cryptographic administration also permits data searching at a central location. For example, an administrator can search for a host name for a certificate management agent and find out what certificate management agent is on a specific host. As another example, the administrator can search for digital certificate data such as common names, organization unit, type of certificate authority that issued a specific digital certificate, etc.

Figure 1:
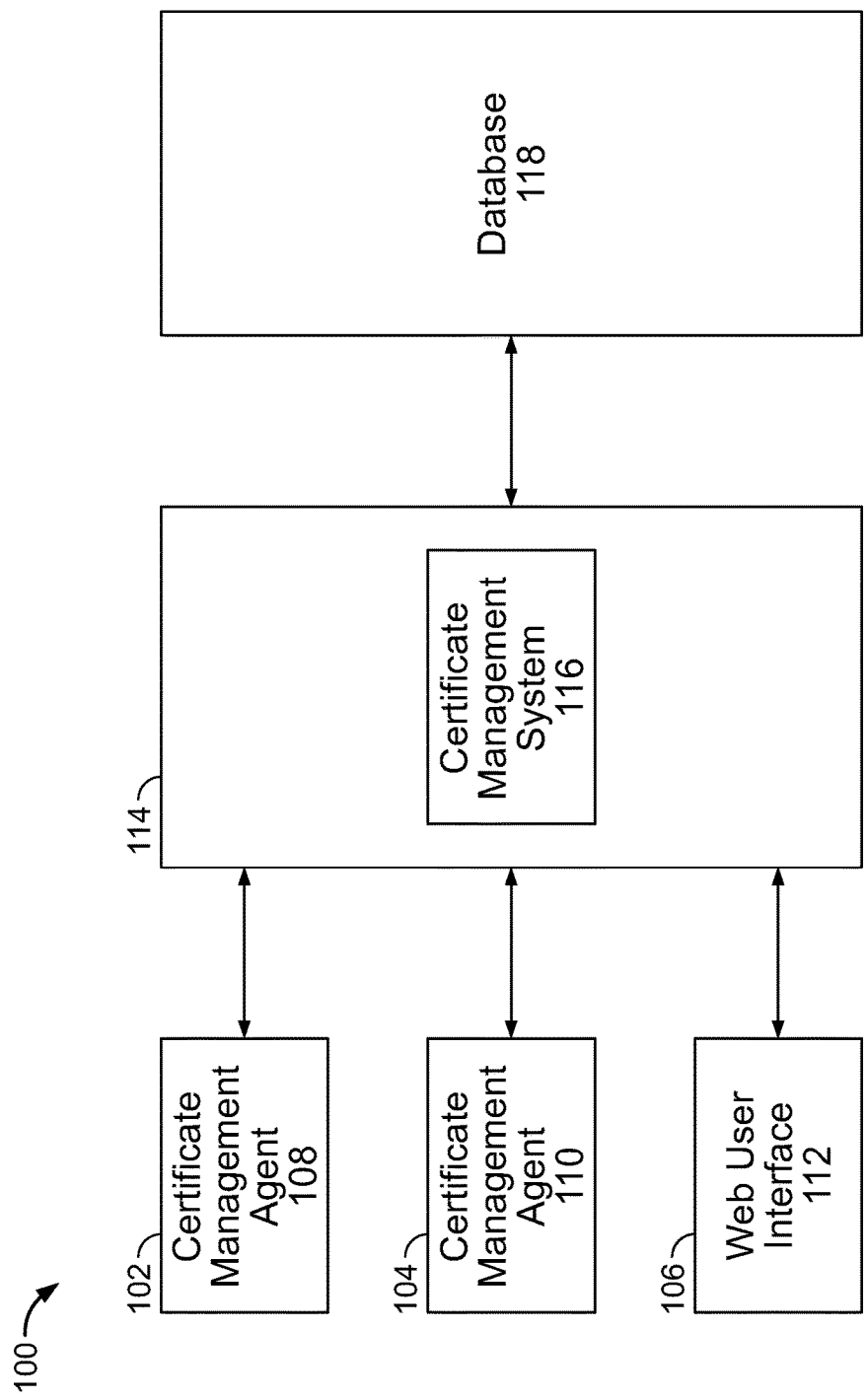
FIG. 1 shows an example system that supports centralized cryptographic management.

FIG. 1 shows an example system 100 that supports centralized cryptographic management. The system 100 includes client computers 102, 104 and 106, server computer 114 and database 118. The system 100 also includes a certificate management agent 108 that runs on client computer 102 and a certificate management agent 110 that runs on client computer 104. A web user interface 112 runs on client computer 106. In addition, the server computer 114 includes a certificate management system 116. More or fewer client computers, server computers and databases may be used.

The example certificate management system 116 processes digital certificate configuration information for client computers 102 and 104. The digital certificate configuration information includes parameters used to issue and maintain a lifecycle of digital certificates used by client computers 102 and 104. The digital certificate configuration information is typically stored on database 118.

The example certificate management agents 108, 110 are software applications installed at client computers 102 and 104, respectively. The certificate management agents 108, 110 manage a lifecycle of the digital certificates used by client computers 102 and 104, respectively, as explained in more detail later herein.

The example web user interface 112 is a user interface that may be used by an administrator to request a certificate management agent for a client computer in system 100. The administrator issues the request at the web user interface 112 and sends the request to the certificate management system 116. As explained in more detail later herein, the certificate management system 116 creates the configuration management agent and permits the configuration management agent to be installed on a client device.

One example of a certificate management system is described in U.S. patent application Ser. No. 11/270,788 filed on Nov. 8, 2005, the entirety of which is hereby incorporated by reference.

Figure 2:
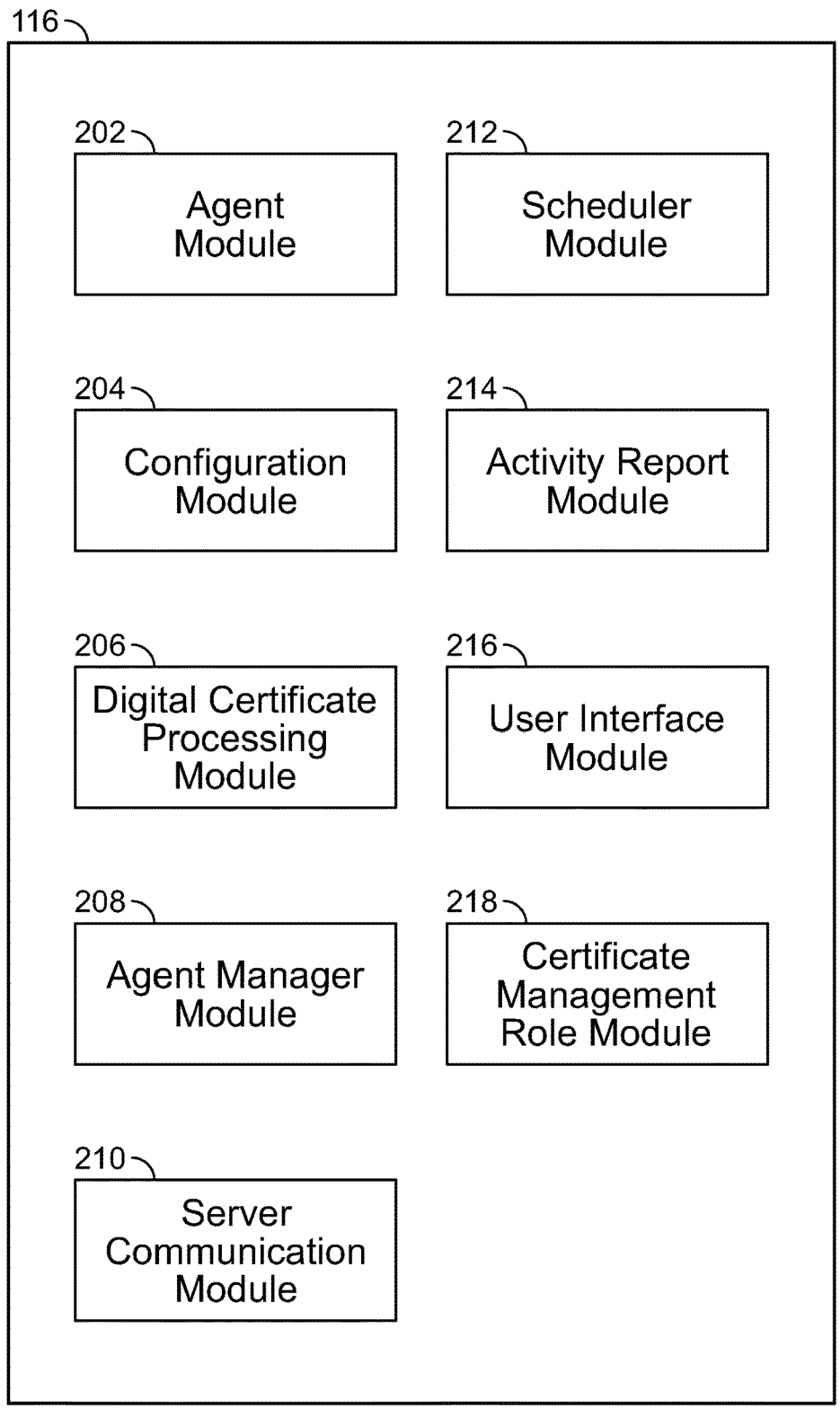
FIG. 2 shows example modules of the certificate management system of FIG. 1.

FIG. 2 shows example modules used in the certificate management system 116. The example modules include an agent module 202, a configuration module 204, a digital certificate processing module 206, an agent manager module 208, a server communication module 210, a scheduler module 212, an activity report module 214, a user interface module 216 and a certificate management role module 218. Other or different modules may be used.

The example agent module 202 provides functionality for creating certificate management agents. In some implementations, a person authorized to create a certificate management agent initiates a request to create the certificate management agent via the web user interface 112. In other implementations, a different user interface may be used, for example a user interface associated with server computer 114.

The person authorized to create the certificate management agent is typically an agent manager or a trusted registrar. An agent manager, as discussed later herein, is a user who has the authority to create configuration management agents. A trusted registrar is a person who has typically been vetted for security purposes and who has been authorized to perform certain certificate management functions for an organization, such as selecting agent managers.

The certificate management agent is a software application that is installed on a client device. After the agent module 202 creates the certificate management agent, an install script is typically sent to the client device. The install script permits the installation of the certificate management agent on the client device.

A process of creating a certificate management agent includes creating a configuration for the certificate management agent and obtaining a digital certificate for the certificate management agent, both explained in more detail later herein. After the configuration is created and the digital certificate is obtained, the certificate management agent generates a unique identifier, an agent ID, for the certificate management agent. The agent ID is sent to the client device and stored on the client device. The agent ID is used in communications between the certificate management agent and the certificate management system 116 to identify the certificate management agent.

The example agent module 202 generates an agent ID for each new certificate management agent. In some implementations, after the certificate management agent is installed on a client device, the agent module 202 provides the agent ID to the client device. In other implementations, the agent ID is provided with the installation of the certificate management agent. The agent module 202 also stores the agent ID in a configuration file for the certificate management agent. The agent module 202 also supports an agent registration bootstrap process, as explained later herein.

The example configuration module 204 processes configuration data for digital certificates. A configuration is a set of parameters used to issue and manage a lifecycle of a digital certificate and is used in the operation of a certificate management agent. The configuration module 204 groups the parameters together in a configuration file. Each configuration file is assigned a name, typically the fully qualified domain name (FQDN) of the client device on which the agent runs.

Each configuration is assigned to a certificate management agent. Typically, each certificate management agent is assigned one configuration. However, there may be instances where a configuration management agent manages multiple configurations, for example when multiple applications requiring digital certificates are configured on the same computing device, for example a web server, an FTPS (file transfer protocol over a secure socket link) server, etc.

Example parameters that may be used in a configuration include configuration name, creation date, agent ID, certificate location, private key location, keystore location, organization name, organizational unit, etc. More, fewer or different parameters may be used.

The configuration module 204 supports the use of configuration templates. A configuration template is a configuration file that permits a user to quickly initialize a new configuration based on a previously saved set of parameters. All fields found in a configuration may be included in a template or left empty in order to fill in a new configuration based on the template. When creating a configuration, an agent manager may choose a template from any previously defined template within an agent group for the agent manager.

The example digital certificate processing module 206 uses configuration data from the configuration module 204 to obtain a digital certificate for the certificate management agent. The digital certificate is obtained from a certificate authority (CA) that manages security credentials and public keys for message encryption.

The example agent manager module 208 provides functionality for agent managers and agent groups. An agent manager is a user who has the authority to add or modify certificate management agents to system 100. For example, an agent manager at the web user interface 112 may request the certificate management agents 108, 110.

Agent managers are typically assigned to an agent group. The agent group typically determines an authority level for the agent managers in the group. Depending on the authority level, agent managers may perform other actions such as adding or modifying configurations, adding or modifying agent groups and scheduling events to take place on an agent. An agent manager's access is restricted to the agent group to which the agent manager is assigned. In some implementations, any agent manager within an agent group may manage any certificate management agents within the agent group.

An agent manager may have multiple access levels including viewing configurations, updating configurations, creating configurations, creating agents, scheduling agent events, suspending configurations, suspending agents and owning an agent group.

An agent manager may be part of multiple agent groups and have different access levels within each agent manager group. For example, an agent manager may have a high access level within one or more agent manager groups while having only limited access, for example read only access, within other agent manager groups.

An agent manager may also add or modify custom keystore types for the agent groups to which the agent manager belongs. A keystore is storage facility for cryptographic keys and certificates. The cryptographic keys generally comprise a private/public key pair that are generated together and associated with a digital certificate. The keystore and associated trust store are typically created using a Java language keytool command. The agent manager supports a scripting mechanism that permits the creation of user defined keystore types.

The agent manager may also add or modify trust store chains used by certificate management agents to create certain types of keystores. A trust store is a collection of digital certificates that are associated with a specific certificate authority. When more than one certificate authority is used, a trust store chain may be created. The trust store determines whether the certificate authority associated with the trust store may be trusted. Trust stores typically have a limited lifetime and expire when the lifetime is reached. The agent manager module 208 updates the trust store chain when the agent manager module 208 determines that a trust store is due to expire. For example, the agent manager module 208 may assign one or more keystores to a different trust store.

In order to become an agent manager, a user needs to be promoted by a trusted registrar. A trusted registrar is a person who has typically been vetted for security purposes and who has been authorized to perform certain certificate management functions for an organization, such as selecting agent managers. Only trusted registrars can create agent groups and assign agent managers as owners of groups.

The example server communication module 210 defines and processes communications between a certificate management agent and the certificate management system 116 on server computer 114. The server communication module 210 supports two models of communication—push and pull. In a preferred pull model, the certificate management agent periodically connects to the certificate management system 116 over an HTTPS connection that lasts for the duration of the communication. After connecting, the certificate management agent sends an HTTP POST message to the certificate management system 116. All message parameters are included as request parameters. The certificate management system 116 responds with an HTTP reply message. Once the reply message is received by the certificate management agent, the HTTPS connection is closed.

With the push model, the certificate management agent acts as an HTTP server waiting for incoming connections. The certificate management system 116 connects to the certificate management agent by opening an HTTPS connection and sending an HTTP POST message to the certificate management agent. The certificate management agent sends an HTTP reply message to the certificate management system 116, after which the certificate management system 116 closes the connection. Message types supported using the push model may include update for certificate management agent configurations, update for trust stores, update for list of scheduled events, perform local certificate validation and report event notifications.

The server communication module 210 and other modules in the certificate management system 116 also support auto-update capabilities for certificate management agents. Each time a certificate management agent connects to the certificate management system 116 in both push and pulls models, the certificate management agent checks for updated items. The updated items may include new agent versions, new configurations and new trusted stores. For example, when a new version becomes available for a certificate management agent, the certificate management system 116 may update the certificate management agent with the new version. Any such updates are performed by a system administrator and are not performed automatically. This ensures that the updates have been validated by the system administrator. In addition, the updates may be scheduled at specific times in order to minimize an impact on the client device on which the certificate management agent is installed.

The scheduler module 212 permits the scheduling of activities to take place on client devices having an installed certificate management agent. Examples of scheduled events include provisioning a certificate and running a script. A scheduled provision of a certificate comprises forcing a provisioning of a certificate at a precise time and date instead of using a default certificate management agent schedule. Running a script comprises running a custom script on the certificate management agent at a specific date and time or on a recurring basis. Other activities and events are possible.

The scheduler module 212 supports both the both the pull and push models discussed. With the pull model, certificate management agents connect to the certificate management system 116 at pre-configured intervals and request scheduled events. With the push model, the certificate management system 116 sends notifications of scheduled events to the certificate management agents. However, for both the pull model and the push model, the events are executed as dictated by the certificate management system 116. For example with the push model, most scheduled events may be executed immediately or at any time in the future. With the pull model, the execution time depends on a frequency of schedule updates configured for the certificate management agent. For example, if a schedule for a certificate management agent is updated every 12 hours, the earliest an event may be scheduled is the next 12 hour time slot, even though a schedule update message may be received sooner.

The example activity report module 214 processes notifications and status reports sent from certificate management agents. For example, certificate management agents may send status regarding their certificates to the certificate management system 116. For example, a status may be sent indicating that a certificate is to expire and needs to be renewed. As another example, a certificate management agent may report configuration errors and other issues. For example, the certificate management agent may report an inability to create a keystore for a renewed certificate. If this status is reported before the certificate is supposed to be installed, a site outage may be prevented.

The notifications and status reports may be sent at various times. Example instances include: when the certificate management agent connects to the server computer 114 in order to receive updates; when the certificate management agent encounters an error while performing tasks; and when a health status of an agent managed certificate cannot be verified. Typically, the frequency of notifications and status reports is included in the configuration for a certificate management agent.

The notifications and status reports received from the certificate management agents provide an enhanced status of activity of certificate management agents and may permit a pro-active correction of outages that may otherwise have occurred. The activity report module 214 acts upon received notifications and status reports from a certificate management agent by following notification rules defined in the configuration file for the certificate management agent.

The example user interface module 216 provides an interface that displays on a web browser user interface on a client device, for example on web user interface 112 on client computer 106. The user interface module 216 receives inputs from diverse groups such as configuration administrators, trusted registrars and public key interface operators. Functions supported via the user interface module 216 include creating/managing configuration management agents, creating/managing configuration templates, creating/managing configurations, scheduling certificate management agent events, running certificate management agent activity reports and applying group settings. Other functions are possible.

The example certificate management role module 218 processes administrative information regarding user roles in configuring and approving certificate management agent configurations. In some implementations, the certificate management role module 218 defines a system configurator role and a trusted registrar role. In other implementations, more or different roles may be defined.

A system configurator is a person with an interest in setting up agents. Typically, the system configurator is a system administrator who has root access on the computing device on which a configuration is to be installed. However, root access is not required. In some implementations, a non-system administrator may be able to create a new configuration and then communicate the configuration to a trusted registrar and/or administrator who has the authority to deploy the configuration on the computing device.

The trusted administrator is a person who has typically been vetted for security purposes and who has been authorized to perform certain certificate management functions for an organization. The trusted registrar approves configurations created by system configurators but is not permitted to modify the configurations.

Figure 3:
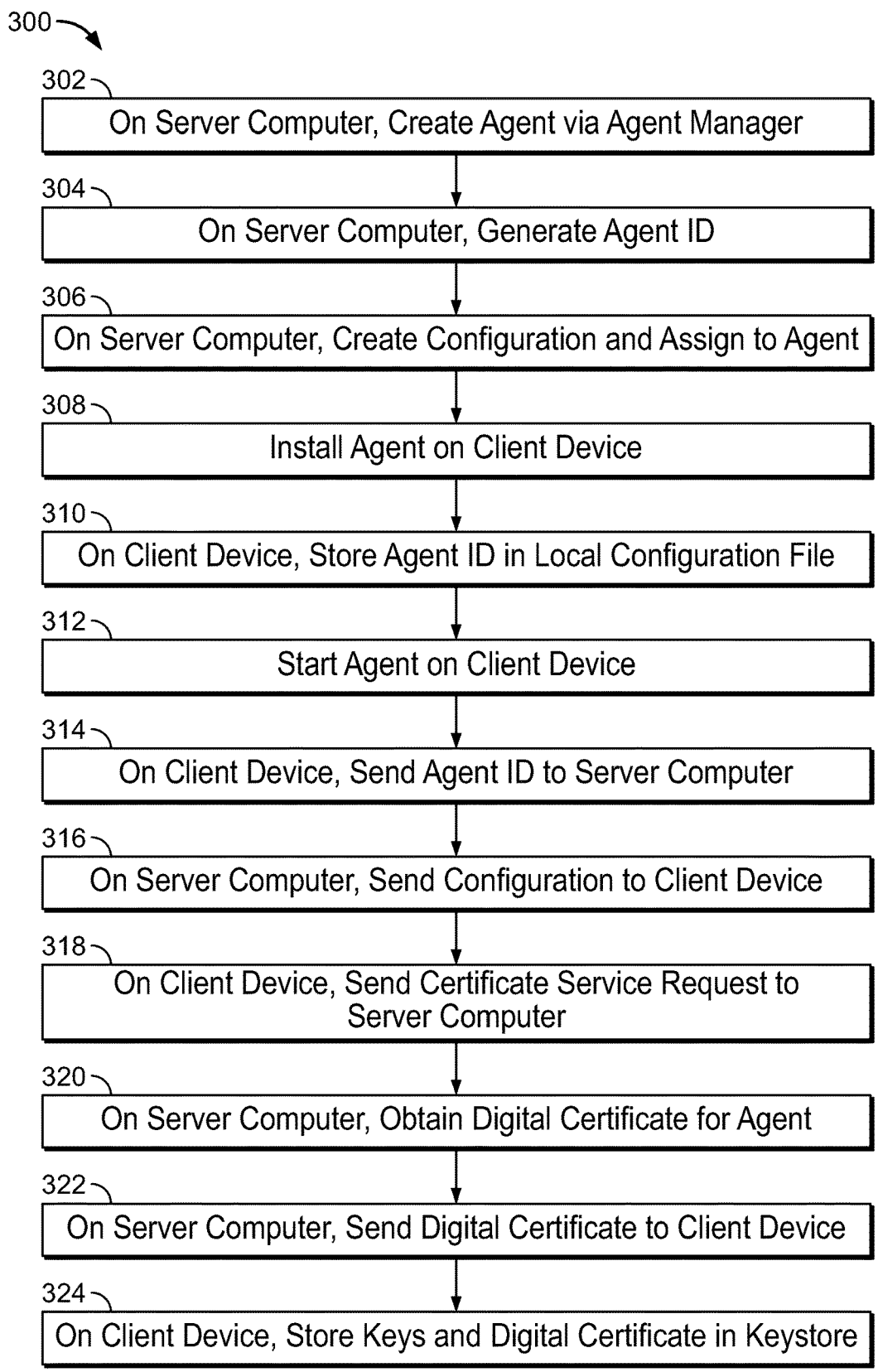
FIG. 3 shows an example method for creating and starting a certificate management agent.

FIG. 3 shows a flowchart of a method 300 for creating and starting a certificate management agent. At operation 302 an agent manager initializes a process for creating the certificate management agent. In some implementations, the agent manager applies to a key management website. The key management website is a web site on which the agent manager is vetted for security purposes and on which the agent manager can request agent services for any server computers and client devices for which the agent manager has authorization. In other implementations, other websites may be used.

At operation 304, on the server computer, for example server computer 114, an agent identifier (agent ID) is generated for the certificate management agent.

At operation 306, the agent manager on the server computer fills in appropriate configuration information into a user interface panel on the key management website, as explained in more detail later herein. The configuration information includes information required by a certificate authority in order to issue a digital certificate for the certificate management agent. The server computer assigns the configuration information to the certificate management agent.

At operation 308, the certificate management agent is installed on a client device, for example client computer 102 or client computer 104. In some implementations, the installation comprises installing a plugin software module on the client device.

At operation 310, the agent ID for the certificate management agent is stored in a local configuration file on the client device.

At operation 312, the certificate management agent is started on the client device.

At operation 314, the client device sends the agent ID to the server computer.

At operation 316, the certificate management system 116 on the server computer sends the configuration information for the certificate management agent to the client device.

At operation 318, the client device sends a certificate service request (CSR) to the server computer.

At operation 320, the server computer obtains the digital certificate for the certificate management agent based on the CSR.

At operation 322, the server computer sends the digital certificate to the client computer.

At operation 324, private and public keys and the digital certificate are stored in a keystore accessible by the client device. The keys and the digital certificate are used in messages from the certificate management agent to the certificate management system 116.

FIG. 4 shows an example user interface panel 400 on the key management website of operation 306. The user interface panel 400 may be used to enter configuration information for the certificate management agent. Configuration parameters that may be entered include an agent ID 402, an agent name 404, a host name 406, an agent group 408, an operating system 410, an operating system version 412, a field for mutual authentication enabled 414, a machine ID type 416, a machine ID 418, a poll messages interval 420, a comments area 422, a status 426, a status comments area

428 and a last modified by field 430. Also included on the user interface panel 400 is an update button 432 and a cancel button 434.

The agent ID 402 is a unique identifier assigned by the certificate management system 116 when an agent record is created. The agent ID 402 is typically automatically entered into the agent ID 402 field.

The agent name 404 is user-friendly name for the agent. The host name 406 is a name for a computing device on which the agent is installed. For example, the host name may be a name assigned to client computer 102 or client computer 104. As shown in FIG. 4, an example hostname is cbui39089.wellsfargo.com. The agent name 404 is typically derived from the host name. As shown in FIG. 4, an example host name is cbui39089.

The assigned to agent group 408 is a name of an agent group to which the agent is assigned. The agent group is typically selected from a pull-down list in the assigned to agent group 408 field. The pull-down list provides a list of available agent groups from which a selection may be made.

The operating system 410 is the operating system of the computing device on which the agent is installed. The operating system version 412 is the version of operating system 410.

The mutual authentication enabled field 414 indicates whether mutual authentication is to be used by the agent. A selection of yes or now may be made. Mutual authentication is discussed later herein.

The machine ID 418 is an identifier specific to the computing device, for example client computer 102, 104, on which the certificate management agent is installed. The machine ID type 416 is a type of the machine ID. A type of MAC (media access control) address, FQDN (fully qualified domain name) of none may be selected via a pull-down list. The machine ID type 416 is used by server computer 114 to validate the certificate management agent when mutual authentication is enabled.

The poll messages interval 420 indicates how often the certificate management agent connects to the certificate management system 116 to check for new messages. A time interval in minutes is entered for the poll messages interval 420.

The comments area 422 permits a user to enter a comment on the user interface panel 400. The comment may have a maximum length of 200 characters. The characters remaining field 424 decrements when characters are added and indicates how many additional characters may be added before the 200 character limit is reached.

The status field 426 indicates the certificate management agent status, as set by the user. The status may be set to one of active, disabled or deleted. The status comments area 428 permits the user to enter a comment regarding the certificate management agent status. Example comments are a reason for the last change, a history of changes, etc.

The last status modified field 430 indicates who last modified the certificate management agent status. As shown in FIG. 4, the status was last modified by the certificate management system 116 (WFCMS). When a user modifies certificate management agent data, the last status modified field 430 typically indicates the user name and email address of the last person who updated the certificate management agent data.

The user interface panel 400 also includes an update button 432 and a cancel button 434. The update button 432 saves any changes made on the user interface panel 400. The cancel button 434 cancels any changes made on the user interface panel 400.

Figure 6:

FIGS. 5, 6 and 6A show another example user interface panel 500 on the key management website of operation 304. The user interface panel 500 permits entry of configuration data that are specific to each digital certificate managed by a certificate management agent. The configuration data is saved in a configuration file for the certificate management agent. The configuration data shown in FIGS. 5, 6 and 6A are described below herein.

The agent ID 502 is an agent identifier for the certificate management agent to which the configuration data belongs. The agent ID 502 is the same identifier as agent ID 402 from FIG. 4. The agent group code 504 is the agent group to which the certificate management agent is assigned.

The operating system 506 is the type of operating system for the computing device on which the certificate management agent is installed. The active field 508 indicates whether the certificate management agent is active. A yes or a no may be entered in the active field 508.

The configuration name 510 is name for the configuration shown in FIGS. 5, 6 and 6A. Typically, the name is a user-friendly name, for example an application name such as FTP or web server or a variation of the certificate management agent name, such as cbu39089 auth certificate, as shown in FIG. 5.

The list of shared agent groups 512 is a list of agent groups with which the configuration shown in FIGS. 5, 6 and 6A is shared.

The comments area 514 is an area in which a user can enter comments regarding the configuration. The comments area 514 permits up to 200 characters to be added. The characters remaining field 516 indicates how many characters may be entered and remain within the 200 character limit.

The common name 518 is a common name to be included in the subject of the digital certificate to be generated.

The certificate type 520 indicates a specific type of certificate. The certificate type is selected from a pull-down list box. Example certificate types are production, test, application certificate, etc.

The certificate authority 522 is a name of an issuing certificate authority (CA) for the digital certificate. The certificate authority 522 is selected from a pull-down list box. An example certificate authority selection is WF Enterprise CA04 (SHA-256).

The trusted registrar group code 524 indicates a name of a registrar group to approve a request for the digital certificate. The trusted registrar group code 524 is selected from a pull-down list box. An example trusted registrar group code selection is 133(WFIS OA Group).

The organization 526 is an organization name to be included in the subject of the digital certificate to be generated. The organization unit 528 is an organization unit name to be included in the subject of the digital certificate to be generated. Typically, an organization is part of an organization unit.

The locality 530 is a locality name to be in the subject of the digital certificate to be generated. The state 532 is a state name to be included in the subject of the digital certificate to be generated. The country 534 is a country name to be included in the subject of the digital certificate to be generated.

The private key length 536 is a number of bits to be used in generating a private key password. The private key length 536 is selected from a pull down list box. In an example configuration, lengths of 1024, 2048 or 4096 bits may be selected. The private key password in a password for the private key of the digital certificate. The private key password encrypts the private key. When the auto-generated checkbox 537 is selected, the private key password 538 is auto-generated. When the auto-generated checkbox 537 is not selected, the private key password 538 is manually entered. When the private key password 538 is manually generated, the private key password 538 needs to be retyped using the re-type password field 540.

The keystore type 542 is a type of keystore to create from the digital certificate. The keystore type is selected from a pull-down list box. In one example implementation, keystore types may include PEM, PKCS12, JKS, CAPI and Custom. In other implementations, more, fewer or different keystore types may be used. The keystore options 544 are optional keystore parameters specific to the keystore type 542 selected.

The trust store 546 is a name of a trust store to use when generating certificate chains for the digital certificate. The keystore password 548 is a password for the keystore selected. The keystore password may be automatically generated by selecting the auto-generated checkbox 547. When the keystore password is manually entered, the manually entered keystore password needs to be re-typed using the re-type keystore password 550.

The certificate file 552 is a location where the digital certificate file is to be stored. The certificate file permissions 554 permits read/write permissions to be selected for an owner, group or other for the digital certificate file. The certificate file ownership 556 specifies user and group ownership for the digital certificate file. The certificate file ownership 556 field applies only to Unix systems.

The private key file location (not shown) is a location where the private key file is stored. The private key file permissions 558 permits read/write permissions to be selected for an owner, group or other for the private key file. The private key file ownership 560 specifies user and group ownership for the private key file. The private key file ownership 560 applies only to Unix systems.

The keystore file 562 is a location where the keystore file (except for the CAPI keystore type) is stored. The CAPI keystore type does not store the keystore in a file. The keystore file permissions 564 permits read/write permissions to be selected for an owner, group or other for the keystore file. The keystore file ownership 566 specifies user and group ownership for the keystore file.

The trust store file 568 is a location where the trust store file is stored. An entry in this location is optional. The trust store file contains all certificate chains provided by server computer 114. The trust store file permissions 570 permits read/write permissions to be selected for an owner, group or other for the trust store file. The output trust store file 572 is a location where the output trust store file is stored. An entry in this location is optional. The output trust store file 572 only contains the certificate-specific chain. The output trust store file permissions 574 permits read/write permissions to be selected for an owner, group or other for the output trust store file.

The status files 576 are a location where status files are stored. The location includes a path plus a base filename. The status files permissions 578 permits read/write permissions to be selected for an owner, group or other for the status files. The status file ownership 580 specifies user and group ownership for the status files.

The request delay time interval 582 specifies how often the certificate management agent connects to server computer 114 for a new request fulfillment. The request delay time interval 582 is entered in minutes.

The expiration check interval 584 specifies how often the certificate management agent checks for digital certificate expiration. The expiration check interval 584 is entered in hours.

The renewal time before expiration 586 specifies how many days before expiration the digital certificate should be renewed. The renewal time before expiration is entered in days.

The provision certificate method 588 indicates a selected method for provisioning the digital certificate after downloading from server computer 114. The method is selected from a pull-down list box. For the example user interface panel 500, either create keystore or create keystore and run custom scripts may be selected.

The validate certificate method 590 indicates a selected method used by the certificate management agent to periodically validate the digital certificate. The method is selected from a pull-down list box. For the example user interface panel 500, either validate certificate file, connect to application, run custom script or none may be selected.

The application type 592 is a type of application using the digital certificate, for example FTP or a web server.

The IP address or URL 594 is the IP address or URL where the application exposes the digital certificate for validation of the digital certificate.

The log type 596 indicates a selected configuration-specific log type, separate from the main certificate agent log. The log type 596 is selected from a pull-down list box. For the example user interface panel 500, either file, system or none may be selected. The log type 596 field is an optional field.

The configuration specific log file 598 indicates a location of the configuration- specific log, when the log type is used.

The script log type 600 indicates a selected configuration-specific script console output capture type, separate from the main certificate agent log. The script log type 600 is selected from a pull-down list box. For the example user interface panel 500, either file, system or none may be selected. The script log type 600 is an optional field.

The script log file (not shown) indicates a location of the configuration-specific script output capture, when the script log type is used.

The user interface panel 500 also includes an update button 602 for saving changes made on the user interface panel 500 and a cancel button 604 for canceling and not saving any changes made.

Figure 7:
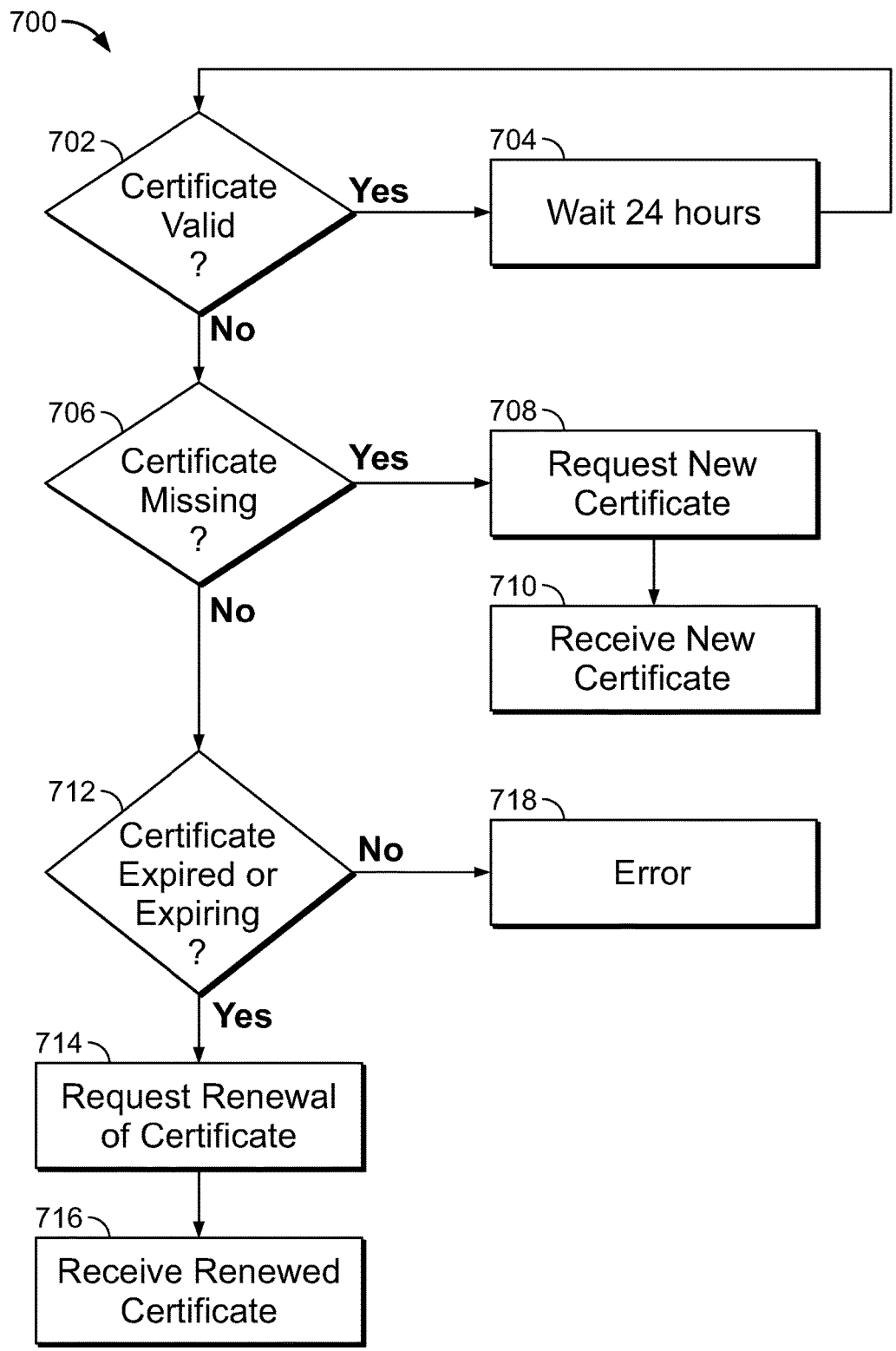
FIG. 7 shows a flowchart of an example method for a certificate management agent communication protocol.

FIG. 7 shows a flowchart of a method 700 for a certificate management agent communication protocol. The method 700 is implemented on the computing device on which the certificate management agent is installed, for example on client computers 102, 104.

At operation 702, a determination is made as to whether the digital certificate installed with the certificate management agent is still valid. Each digital certificate has an expiration date, typically one year or two years. The determination as to whether the digital certificate is valid is performed at periodic intervals, typically an interval of one day, although other intervals may be used.

When a determination is made at operation 702 that the digital certificate is valid, at operation 704, a timer is set for 24 hours. After 24 hours, operation 702 is executed again. When a determination is made at operation 702 that the digital certificate is not valid, at operation 706, a determination is made as to whether the digital certificate is missing. A determination that the digital certificate is missing indicates that the digital certificate was not installed on the client device or that the digital certificate was de-installed on the client device.

When a determination is made at operation 706 that the digital certificate is missing, at operation 708 a new certificate is requested. The new certificate is requested by sending a new certificate request message to the certificate management system 116. In some implementations, a requestNewCertificate message type is used along with a certificate signing request (CSR) as a parameter. The certificate management system 116 typically sends the certificate request to a certificate authority. At operation 710 the digital certificate is received at the client device.

When a determination is made at operation 706 that the digital certificate is not missing, at operation 712 a determination is made as to whether the digital certificate is expired or expiring. As discussed, digital certificates typically are valid for one or two years.

When a determination is made at operation 712 that the digital certificate has expired or is expiring, at operation 714 a renewal certificate is requested. The renewal certificate is requested by sending a renew certificate request message to the certificate management system 116. In some implementations, a renewCertificate message type is used along with a CSR as a parameter. The certificate management system 116 typically sends the certificate renewal request to a certificate authority. At operation 710 the renewed digital certificate is received at the client device.

When a determination is made at operation 712 that the digital certificate has not expired or is not expiring, an operation 718, an error message is generated.

The certificate management system 116 implements a protocol of mutual authentication between certificate management agents and the certificate management system 116. The mutual authentication permits the certificate management agents to connect to the certificate management system 116 in a secure manner. Authentication is provided both at the client devices that host the certificate management agents and at server computer 114 that hosts the certificate management system 116.

The mutual authentication requires that prior to establishing a secure SSL (secure socket layer) connection, both a certificate management agent (for example certificate management agent 108 or certificate management agent 110) and the certificate management system 116 need to confirm each other's identity. In order to confirm each other's identity, the certificate management system 116 and the certificate management agents 108, 110 store each other's digital certificates and trust stores which are required to establish the SSL connection. The certificate management system 116 stores digital certificates for certificate management agents 108, 110 in database 118. The certificate management agents 108, 110 store a digital certificate for the certificate management system 116 in a local trust store file. The local trust store file is included in an installation package for the certificate management agents 108, 110 and is updated automatically by the certificate management system 116 when changes occur.

The mutual authentication system uses two stages of authentication, first by establishing a SSL connection and then by validating a certificate management agent's machine ID.

The machine ID is an identifier specific to the computing device on which the agent is installed. The machine ID may be supplied by the certificate management system 116 or by the certificate management agent 108, 110. When supplied by the certificate management system 116, the machine ID is typically either the IP address or the FQDN of the certificate management agent 108, 110. When supplied from the certificate management agent 108, 110, the machine ID is the media access control (MAC) address of the certificate management agent 108, 110. A combination of the machine ID and the digital certificate of the certificate management agent 108, 110 form a unique identification.

Figure 8:
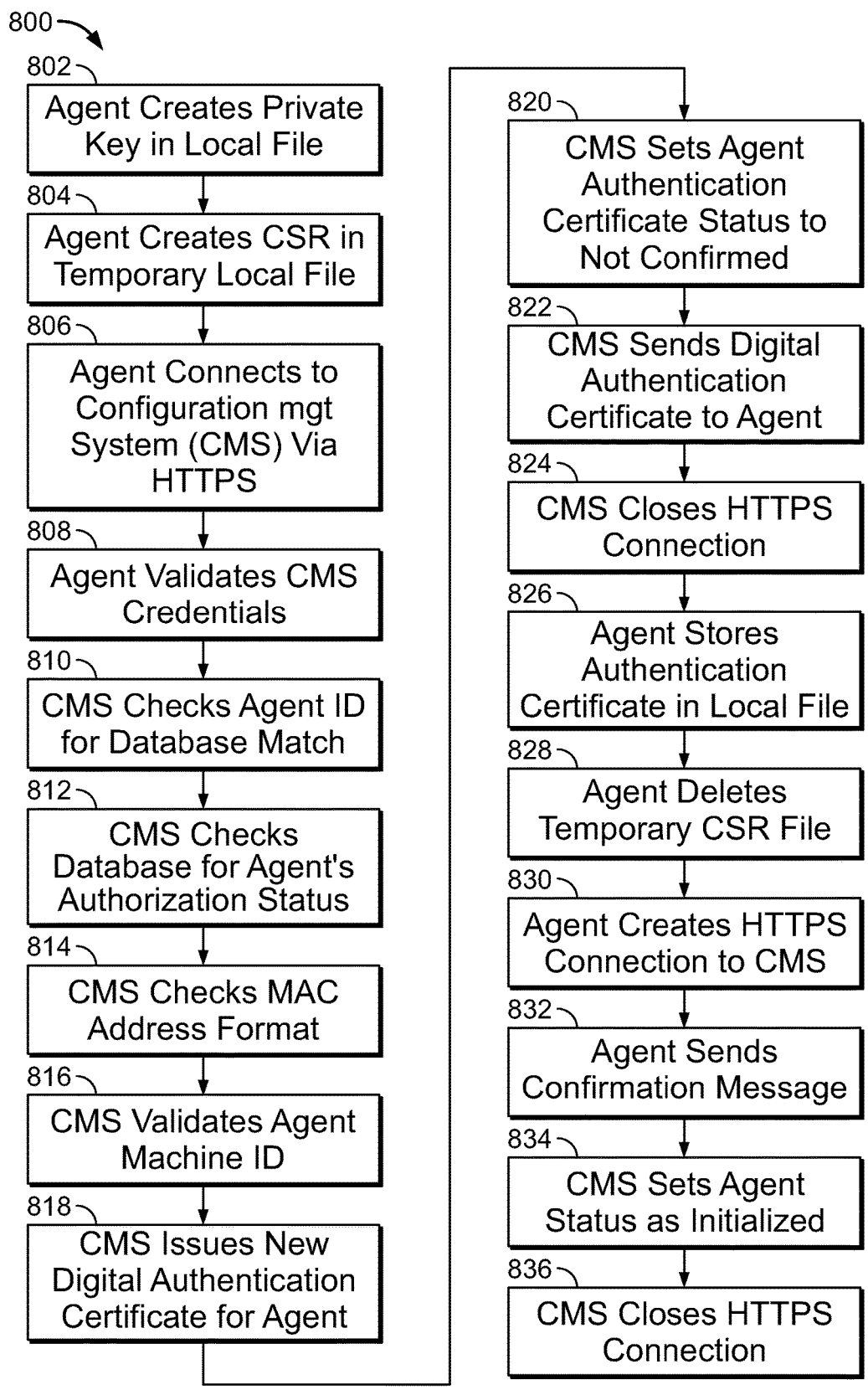
FIG. 8 shows a flowchart of an example method for establishing a first time connection between a certificate management agent and the certificate management system of FIG. 1.

FIG. 8 shows an example flow chart of a method 800 for establishing a first time connection between certificate management agent 108, 110 and certificate management system 116. In this disclosure, a first time connection occurs when a digital certificate is not present for certificate management agent 108, 110 or when the digital certificate has expired. The first time connection occurs after the certificate management agent 108, 110 is installed on client device 102, 104, respectively. The method 800 is explained herein for certificate management agent 108, but also applied to certificate management agent 110.

At operation 802, certificate management agent 108 creates a private cryptographic key, encrypts the private key with a password assigned to the certificate management agent 108 and stores the encrypted private key in a file on client device 102.

At operation 804, certificate management agent 108 creates a CSR and stores the CSR in a temporary file on client device 102. The CSR is a message sent from certificate management agent 108 to a certificate authority in order to apply for a digital certificate. The CSR typically includes the FQDN of the certificate management agent 108 and may also include other fields such as a name and address of a business organization and an email address. Other fields are possible. The business organization is a business organization in which certificate management agent 108 is used.

At operation 806, an HTTPS connection is made between the certificate management agent 108 and the certificate management system 116. The certificate management agent 108 sends a request for a digital certificate to the certificate management system 116 via the HTTPS connection. The request includes the agent ID for certificate management agent 108.

At operation 808, a determination is made as to whether a digital certificate from the certificate management agent 108 is valid. This validity check is made each time the certificate management agent 108 connects to the certificate management system 116. At this time, a determination is made that the digital certificate had not been issued yet.

At operation 810, the certificate management system 116 checks the agent ID in the request message to determine whether there is a match for the agent ID in database 118. When a determination is made that there is not a match, an error is logged and the HTTPS connection is closed.

When a determination is made at operation 810 that the agent ID is valid, at operation 812, an authentication status for the certificate management agent 108 is checked. If a determination is made that the certificate management agent 108 has already been initialized, an error is logged, because the certificate management agent 108 should not have been initialized at this point.

When a determination is made at operation 812 that the certificate management agent 108 has not been initialized, at operation 814, a determination is made as to whether the MAC address for the certificate management agent 108 is valid and in a proper format.

When a determination is made at operation 814 that the MAC address is in a proper format, an operation 816 a determination is made as to whether the machine ID is valid. In this case the machine ID is the MAC address. During the validation procedure at operation 816, database 118 is checked to determine whether the actual machine ID in the request message corresponds to the machine ID registered for certificate management agent ID in database 118.

At operation 818, the certificate management system 116 issues a digital certificate to the certificate management agent 108. The certificate management system 116 obtains the digital certificate from a certificate authority, using the CSR in the request message.

At operation 820, the certificate management system 116 sets a status for the certificate management agent 108 to "authentication status not confirmed." This status is changed to "initialized" later in method 800 as explained later herein.

At operation 822, the certificate management system 116 sends the issued digital certificate to certificate management agent 108 via the HTTPS connection.

At operation 824, the certificate management system 116 closes the HTTPS connection.

At operation 826, the certificate management agent 108 receives the digital certificate and stores the digital certificate in a pre-defined local file.

At operation 828, the certificate management agent 108 deletes the temporary CSR file.

At operation 830, the certificate management agent 108 creates a new HTTPS connection to the certificate management system 116. The purpose of the connection is to test out the digital certificate and have the certificate management system 116 confirm receipt of the digital certificate.

At operation 832, the certificate management agent 108 sends a test message to the certificate management system 116 via the new HTTPS connection. The test message includes the machine ID and the digital certificate. The certificate management system 116 processes the test message.

At operation 834, when the test message has been successfully processed by the certificate management system 116, the certificate management system 116 sets a status for the certificate management agent 108 to "initialized."

At operation 836, the certificate management system 116 closes the new HTTPS connection.

Figure 9:
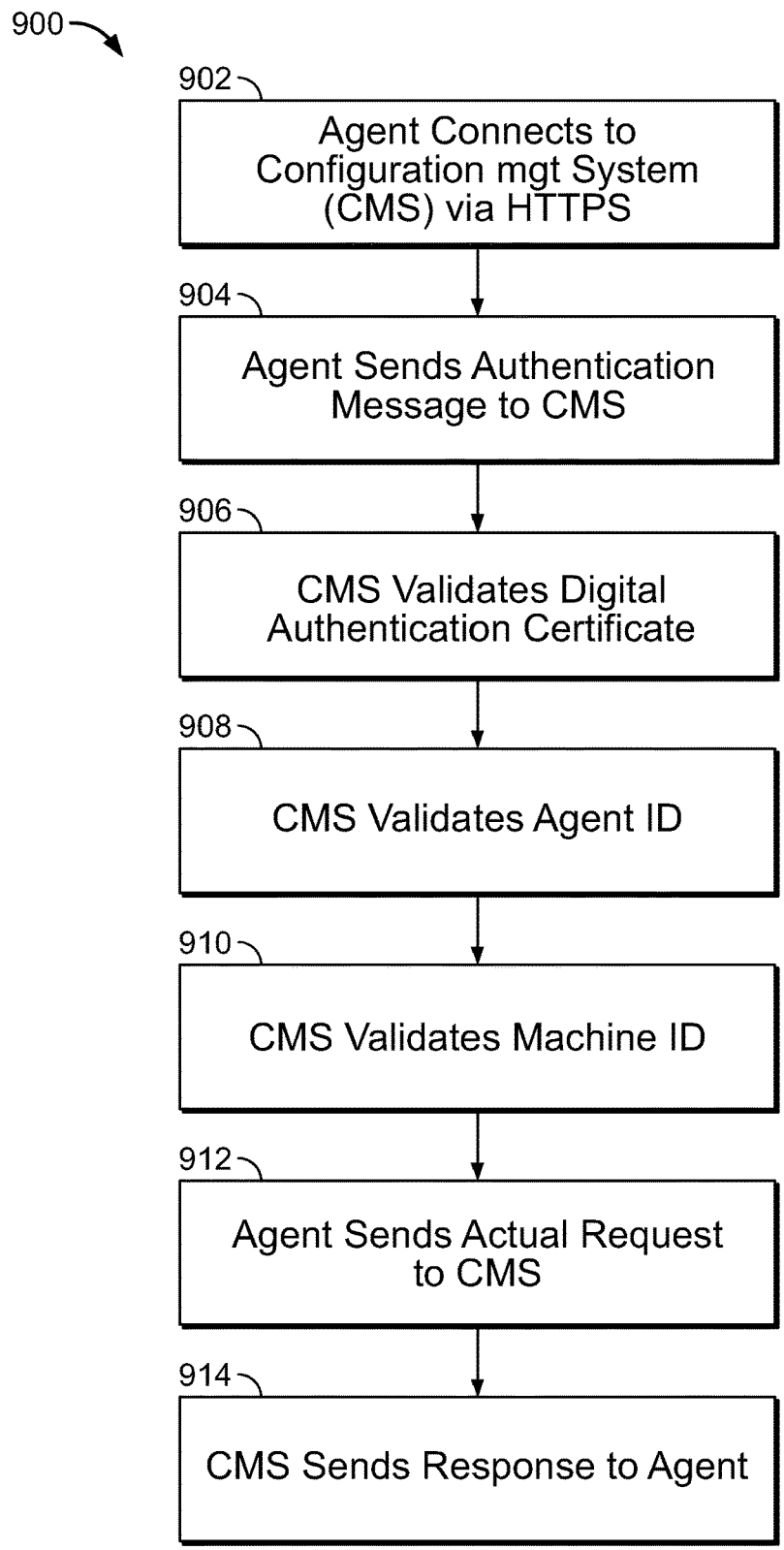
FIG. 9 shows a flowchart of an example method for establishing a connection between a certificate management agent and the certificate management system of FIG. 1 after the configuration management agent has been initialized.

FIG. 9 shows an example flow chart of a method 900 for a connection from the certificate management agent 108 to the certificate management system 116 after the certificate management agent 108 has been initialized.

At operation 902, the certificate management agent 108 connects to the certificate management system 116 via an HTTPS connection. The certificate management agent 108 includes the digital authentication certificate, the machine ID and the agent ID of the certificate management agent 108.

At operation 904, the certificate management agent 108 sends an authentication message to the certificate management system 116. The authentication message includes the digital authentication certificate, the machine ID and the agent ID of the certificate management agent 108.

At operation 906, the certificate management system 116 validates the digital authentication certificate. Authentication comprises validating that the digital authentication certificate has not expired or been revoked. Authentication also comprises validating that the digital authentication certificate matches a digital authentication certificate stored in database 118 for the agent ID corresponding to certificate management agent 108.

At operation 908, the certificate management system 116 validates the agent ID. Validation of the agent ID comprises making a determination that the agent ID in the authentication message matches the agent ID stored in database 118 for the certificate management agent 108.

At operation 910, the certificate management system 116 validates the machine ID. Validation of the machine ID comprises making a determination that the machine ID in the authentication message matches the machine ID stored in database 118 for the certificate management agent 108.

At operation 912, once validation is completed, the certificate management agent 108 sends an actual request to the certificate management system 116. At operation 914, the certificate management system 116 sends a response to the certificate management agent 108.

Figure 10:
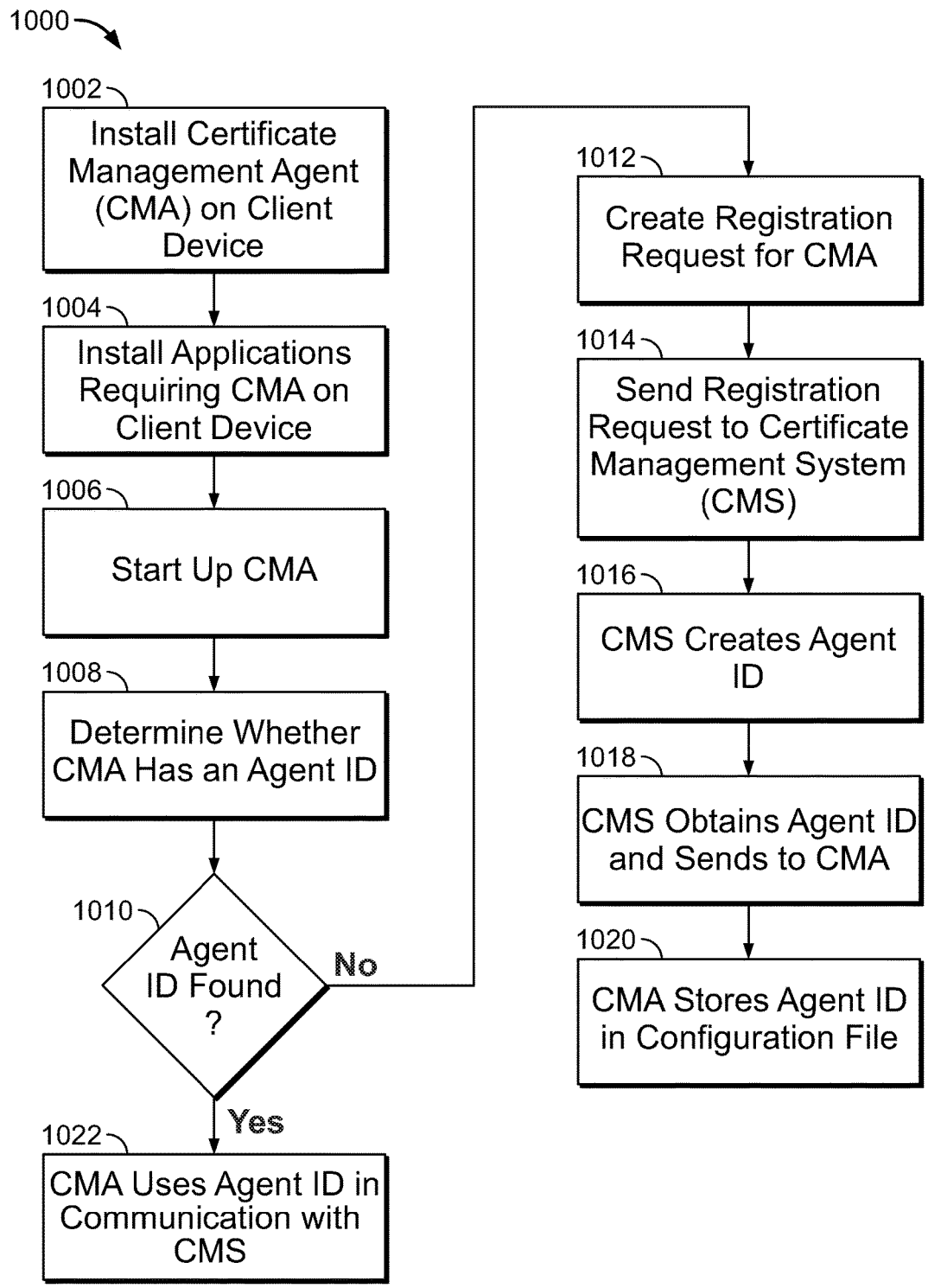
FIG. 10 shows a flowchart of an example method for obtaining an agent identifier for a certificate management agent.

FIG. 10 shows an example flow chart of a method 1000 for obtaining an identifier for a certificate management agent at a client device. The method 1000 illustrates a bootstrap procedure whereby a certificate management agent is obtained with a minimal configuration and a full configuration is obtained after the full configuration is created in the certificate management system 116.

At operation 1002, a certificate management agent is installed on a client device, for example on client computer 102 or on client computer 104. In some implementations, the certificate management agent is installed with a minimal configuration. In other implementations, the certificate management agent is installed without a configuration file.

At operation 1004, software applications that require a digital certificate are installed or discovered at the client device. The software applications are modified to make the certificate management agent aware that the software applications require a digital certificate.

At operation 1006, the certificate management agent is started.

At operation 1008, after the certificate management agent is started, a determination is made as to whether there is an agent ID in the configuration file for the certificate management agent.

At operation 1010, when a determination is made that there is not an agent ID in the configuration file, at operation 1012 a registration request for the certificate management agent is created.

At operation 1014, the registration request is sent to the certificate management system 116.

At operation 1016, the certificate management system 116, creates the agent ID.

At operation 1018, the agent ID is sent to the configuration management agent.

At operation 1020, the configuration management agent stores the agent ID in the configuration file for the certificate management agent.

At operation 1010, when a determination is made that the configuration management agent has the agent ID, the configuration management agent uses the agent ID in communications with the certificate management system 116.

Figure 11:
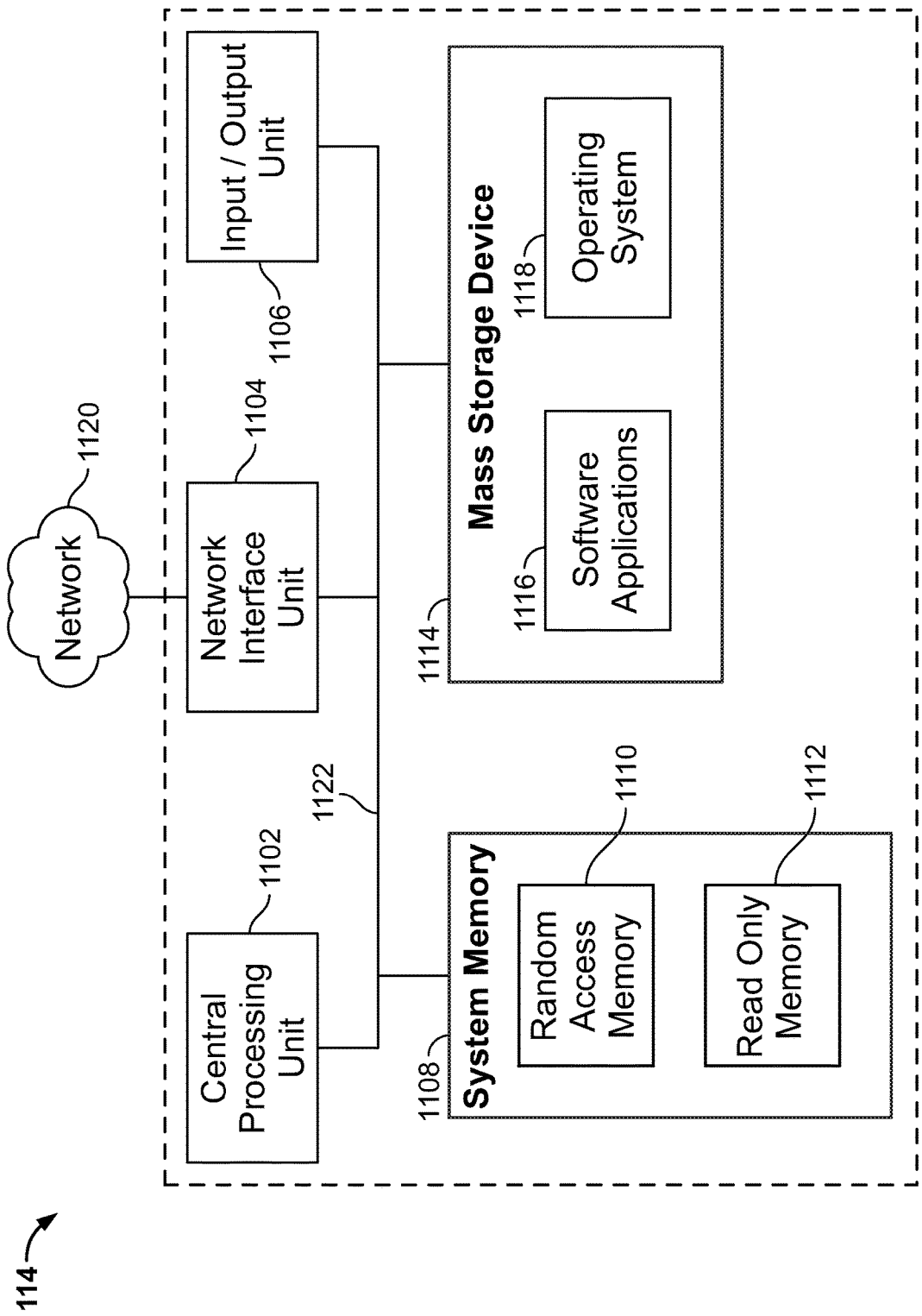
FIG. 11 shows example physical components of the server computer of FIG. 1.

As illustrated in the example of FIG. 11, the server computer 114 includes at least one central processing unit ("CPU") 1102, a system memory 1108, and a system bus 1122 that couples the system memory 1108 to the CPU 1102. The system memory 1108 includes a random access memory ("RAM") 1110 and a read-only memory ("ROM") 1112. A basic input/output system contains the basic routines that help to transfer information between elements within the server computer 114, such as during startup, is stored in the ROM 1112. The server computer 114 further includes a mass storage device 1114. The mass storage device 1114 is able to store software instructions and data. A central processing unit, system memory and mass storage device similar to that in FIG. 11 are also included in client computer 102 and client computer 104.

The mass storage device 1114 is connected to the CPU 1102 through a mass storage controller (not shown) connected to the system bus 1122. The mass storage device 1114 and its associated computer-readable data storage media provide non-volatile, non-transitory storage for the server computer 114. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computer 114.

According to various embodiments of the invention, the server computer 114 may operate in a networked environment using logical connections to remote network devices through the network 1120, such as a wireless network, the Internet, or another type of network. The server computer 114 may connect to the network 1120 through a network interface unit 1104 connected to the system bus 1122. It should be appreciated that the network interface unit 1104 may also be utilized to connect to other types of networks and remote computing systems. The server computer 114 also includes an input/output controller 1106 for receiving and processing input from a number of other devices, including a touch user interface display screen, or another type of input device. Similarly, the input/output controller 1106 may provide output to a touch user interface display screen or other type of output device.

As mentioned briefly above, the mass storage device 1114 and the RAM 1110 of the server computer 114 can store software instructions and data. The software instructions include an operating system 1118 suitable for controlling the operation of the server computer 114. The mass storage device 1114 and/or the RAM 1110 also store software instructions, that when executed by the CPU 1102, cause the server computer 114 to provide the functionality of the server computer 114 discussed in this document. For example, the mass storage device 1114 and/or the RAM 1110 can store software instructions that, when executed by the CPU 1102, cause the server computer 114 to display received financial data on the display screen of the server computer 114.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A system implemented on a server computer for managing digital certificates, the system comprising:

a computer-readable storage medium encoding instructions; and a processor programmed to execute the instructions to create:

an agent module, the agent module processing requests to create a plurality of certificate management agents for managing lifecycles of digital certificates, each of the plurality of certificate management agents being configured to manage a lifecycle of a digital certificate for a client electronic device, and at least one of the plurality of certificate management agents being stored on each client electronic device;

a digital certificate processing module, the digital certificate processing module processing requests from the agent module for digital certificates for the plurality of certificate management agents;

a configuration module, the configuration module receiving and processing configuration parameters for the certificate management agents and for the digital certificates; and an agent manager module configured to add or modify agent groups, wherein each agent group comprises one or more agent managers for managing one or more of the certificate management agents, wherein each agent manager is associated with an assignable authority level, wherein each agent manager is assignable to multiple agent groups, and wherein each agent manager is assignable to different authority levels within different agent groups;

wherein the agent module generates a unique identifier for each of the plurality of certificate management agents when each of the plurality of certificate management agents is created, and wherein the unique identifier is different for each certificate management agent and is based on a respective client electronic device; and wherein the digital certificate processing module generates a digital certificate on the server computer for the client electronic device based upon configuration information from the configuration module, the configuration module using the unique identifier to identify the configuration information for the client electronic device.

2. The system of claim 1, wherein the digital certificate processing module provides the configuration information for the digital certificates to a certificate authority and obtains the digital certificates from the certificate authority.

3. The system of claim 1, wherein the configuration module includes a plurality of configuration templates.

4. The system of claim 1, wherein the agent manager module is further configured to add or modify configuration management agents for the multiple agent groups.

5. The system of claim 1, further comprising a scheduler module for scheduling a provisioning of a digital certificate at the client electronic device.

6. The system of claim 1, further comprising an activity report module for receiving reports regarding a health status of a digital certificate.

7. The system of claim 1, further comprising a server communication module for establishing a mode of communication between the server computer and a certificate management agent on the client electronic device, wherein the mode of communication is either a push mode or a pull mode, the push mode comprising initiating communications to the client electronic device from the server computer, the pull mode comprising receiving communications at the server computer initiated at the client electronic device.

\* \* \* \* \*